UNITED STATES PATENT OFFICE.

AMOS HERBERT HOBSON, OF WESTMINSTER, COUNTY OF MIDDLESEX, ENGLAND.

PROCESS OF SEPARATING GELATINE FROM BONES.

SPECIFICATION forming part of Letters Patent No. 394,982, dated December 25, 1888.

Application filed April 5, 1888. Serial No. 269,727. (No specimens.)

*To all whom it may concern:*

Be it known that I, AMOS HERBERT HOBSON, analytical chemist, a subject of the Queen of Great Britain, of 5 Westminster Chambers, Victoria street, in the city of Westminster, England, have invented certain new and useful improvements in the treatment of bones and animal waste or refuse generally for the purpose of rendering the same more suited for fertilizing purposes, and for obtaining gelatine, glue, and size; and I do hereby declare that the following is a full, clear, and exact description of the invention, which will enable others skilled in the art to which it appertains to make and use the same.

My invention relates to the treatment of bones and animal waste and refuse generally—such, for example, as fish or fish-scrap, (*i. e.*, the heads and tails of fish,) and the horns, hoofs, skins, cartilages, and meat of animals; and the objects of my invention are (*a*) to render such bones, refuse, or waste more suited for fertilizing purposes, or (*b*) to extract the gelatine, glue, or size from such bones, refuse, or waste while leaving a residue possessing valuable fertilizing properties.

The invention as applied to the treatment of bones and other refuse for manure only has for effect to bring the nitrogenous constituents of the bones, &c., into a soluble condition, in which they are more readily assimilable, while still remaining in admixture with the mineral constituents, and as applied to the treatment of bones and other refuse for the extraction of the glue, gelatine, or size it has for effect to separate all or the greater portion of the nitrogenous constituents and at the same time render the mineral or inorganic portions better suited for fertilizing than they are when untreated.

If bones be treated with from five to ten per cent. of their weight of caustic potash or its equivalent, the nitrogenous and investing membranous matter of the bone is dissolved with partial decomposition, especially if heated to or above boiling-point, and with some loss of ammonia, more particularly if more than ten per cent. of the potash or its equivalent be added.

The process of my invention is applied to the production of manure in the following manner: The bones, preferably reduced to the form of moderately fine powder, are heated with about ten per cent. of their weight of caustic potash (or the equivalent of other alkali, such as caustic soda, carbonate of potash or soda, &c.) dissolved in sufficient water to form a creamy mixture with the bone, the amount required being generally equal to the weight of the bones. The operation is performed at a temperature, say, between 180° and 210° Fahrenheit, and is continued with frequent stirring for eight or ten hours, or until the nitrogenous matter is completely dissolved. The mixture may either be used directly as liquid manure or it may be evaporated to dryness. The nitrogenous matter in either case remains associated with the mineral matter of the bones, but in a form capable of being more quickly assimilated by vegetation.

When the proportion of alkali is less than five per cent. of the weight of the bones, the nitrogenous and investing membranous matter is also dissolved more or less completely, but with little or no decomposition or loss of ammonia, and the solution obtained leaves on evaporation a residue having the properties of gelatine, glue, or size, as the case may be, while the insoluble residue is far better suited as regards assimilation of phosphates to perform its function as a food for plants than bones in the untreated state, in consequence of the whole or greater part of the nitrogenous portion having been dissolved out and the bone reduced to a friable condition, instead of being dense and hard, as it is without such treatment.

In applying this process to the production of both manure and gelatine, glue, or size, I first, if necessary, cleanse the bone of any adhering or contained fat in the ordinary way, or remove the fat by the use of benzine or other solvent of fatty matter, and I then add to the bone and water with which it is mixed caustic potash, caustic soda, or equivalent of other alkali (in the proportion of from one to five per cent. of the weight of the bone) and heat to a temperature, say, between 180° and 200° Fahrenheit for five to fifteen hours, according to the nature of the bone, &c., and the product required.

Bones in commerce may be derived from one or many kinds of animals, and are usually mixed. The time of heating and proportion of alkali therefore necessarily varies, and with ordinary bones in the London market the time required when making glue or gelatine is nine or ten hours, a more prolonged heating being liable to injure the product; but in making size, which does not depend for its utility so much as the gelatine or glue upon its adhesive qualities, the heating may be continued until practically the whole of the nitrogenous matter is dissolved out—say for twelve to fifteen hours. Whichever product is required, the solution is then drawn off from the bone and filtered or allowed to settle and decanted off. It is afterward evaporated at as low a heat as possible—say at about 160° to 180° Fahrenheit—to a suitable consistence for use as gelatine, glue, or size. When the solution of nitrogenous matter is to be brought to a highly-concentrated or solid state for use as glue, gelatine, or size, it is advisable before commencing to evaporate to arrest the action of the alkali by wholly or partially neutralizing it by the addition of a chemically-equivalent quantity of an acid, such as sulphuric, sulphurous, or hydrochloric acid. As the lees may contain sufficient soluble matter to be worth extraction, I may wash it and concentrate this second extract so obtained along with the first. I may then with advantage add to the residual bone about five per cent. of caustic potash or an equivalent of another alkali and sufficient water to make a creamy mixture with the bone, and heat the mixture for a few hours for the purpose of dissolving as completely as possible any nitrogenous matter remaining after the extraction of the glue, and use the bone and dissolved nitrogenous matter directly as manure, or evaporate to dryness.

In the application of this invention I do not confine myself to the use of the exact quantities given above, but may vary them to suit the special circumstances of each particular requirement.

Although I have described the treatment of bones only, I would have it clearly understood that the treatment is also applicable to animal refuse or waste generally with but little, if any, modification. It is impossible to describe in detail a special treatment for each of the many kinds of animal matter; but I may state that the only practical variation will be in the amount of potash or other alkali used. This amount will vary according to the solubility of the particular substance under treatment.

I claim—

1. The herein-described process of treating bones and other animal refuse or waste for the purpose of extracting gelatine, glue, or size and leaving a residue fit for use as a fertilizer, which process consists, essentially, in digesting the bones, &c., in an alkaline solution of such strength and in the presence of heat for such a length of time as to dissolve a greater or less portion of the nitrogenous and investing membranous matter, according as glue, gelatine, or size is required, in then drawing off the resultant solution and filtering it, and in then concentrating the filtered solution, as herein described.

2. The herein-described process of treating bones, which consists in digesting the bones in an alkaline solution in the presence of heat, then separating and concentrating the solution, thereby forming glue, gelatine, or size, in then digesting the remaining bone in a strong alkaline solution, so as to completely dissolve the remaining nitrogenous matter and bring the same into a more readily assimilable form, as described.

AMOS HERBERT HOBSON.

Witnesses:
T. W. MUMFORD,
  37 *Oxford Road, Ealing.*
B. C. DIXON,
  11 *The Croft, Leigham Lane, Streatham.*